July 21, 1959     R. J. FLICK     2,895,313
AIR CONDITIONER EVAPORATOR UNIT

Filed Aug. 14, 1957     3 Sheets-Sheet 1

R. J. FLICK
INVENTOR.

BY E. C. McRae
J. R. Faulkner
T. H. Oster

ATTORNEYS

July 21, 1959     R. J. FLICK     2,895,313
AIR CONDITIONER EVAPORATOR UNIT

Filed Aug. 14, 1957     3 Sheets-Sheet 2

R. J. FLICK
INVENTOR.

E. C. McRae
J. R. Faulkner
T. H. Oster
BY

ATTORNEYS

July 21, 1959

R. J. FLICK 2,895,313

AIR CONDITIONER EVAPORATOR UNIT

Filed Aug. 14, 1957

R. J. FLICK
INVENTOR.

BY E. C. McRae
J. R. Faulkner
T. H. Oster

ATTORNEYS

United States Patent Office 2,895,313
Patented July 21, 1959

2,895,313

AIR CONDITIONER EVAPORATOR UNIT

Ralph J. Flick, Inkster Village, Mich., assignor to Ford Motor Company, Dearborn, Mich., a corporation of Delaware Application August 14, 1957, Serial No. 678,087

4 Claims. (Cl. 62—426)

This invention pertains to air conditioning and more particularly to an air conditioner evaporator unit adapted for use on motor vehicles.

An object of this invention is the provision of an efficient evaporator unit for cooling the passenger compartment of a motor vehicle.

A further object is to provide an axial flow evaporator wherein a blower is enclosed by evaporator coils.

Another object is to provide an evaporator unit which may be installed through the turret of a motor vehicle passenger compartment with a minimum of modification to the vehicle.

A further object is the provision of a unitary combination mounting base, drip pan, and air duct.

A still further object is the provision of an evaporator unit having a high degree of air circulation utilizing a minimum of space. Further objects and advantages will become apparent from the following detailed description of an embodiment of my invention in which.

Figure 1:
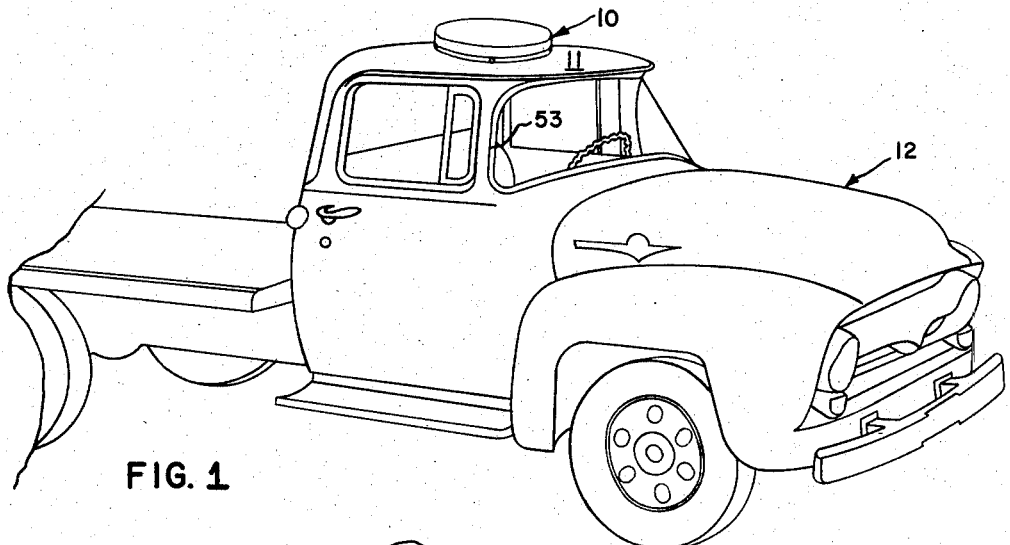
Figure 1 shows the arrangement of my evaporator unit mounted on the turret of the cab of a truck.

Referring to Figure 1, the evaporator unit 10 is shown mounted on the turret 11 of the passenger compartment of a truck 12.

Figure 2:
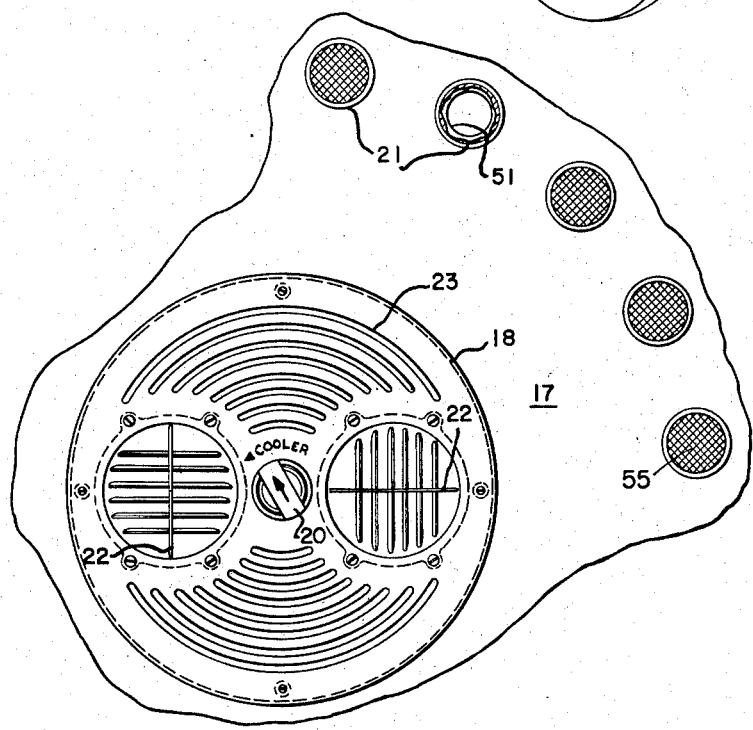
Figure 2 is a partial view of the roof liner of a passenger compartment showing the air inlet and outlet duct arrangement.

Figure 2 shows an arrangement which may be used for directing the air from evaporator unit 10 within the passenger compartment. Grille 18 is mounted on headliner 17 and is in communication with the air outlet opening of the evaporator unit, as will be subsequently explained. Openings 23 and directable vanes 22 may be provided in grille 18 to give the desired direction to the flow of cold air. Motor rheostat 20 may be centrally located to control the fan speed for the purpose that will be subsequently explained. Caps 21 are radially disposed about grille 18 and serve to cover openings 51 in the headliner that communicate with the air intake provisions within the evaporator unit. The caps 21 may take the form of snap-in plug devices provided with a screened or otherwise perforate opening 55 through which the intake or return air from the vehicle compartment flows.

Figure 3:
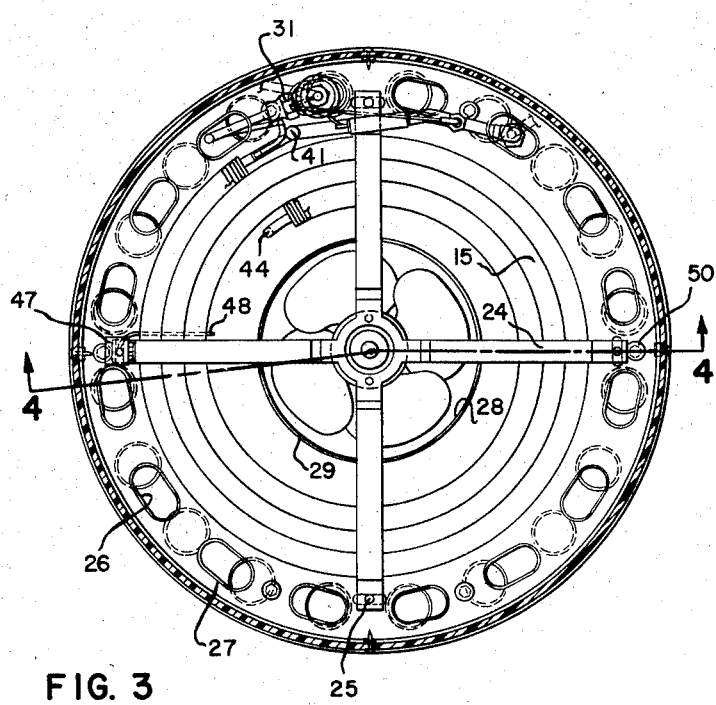
Figure 3 is an elevational view of my invention with the cover cut away.
Figure 4:
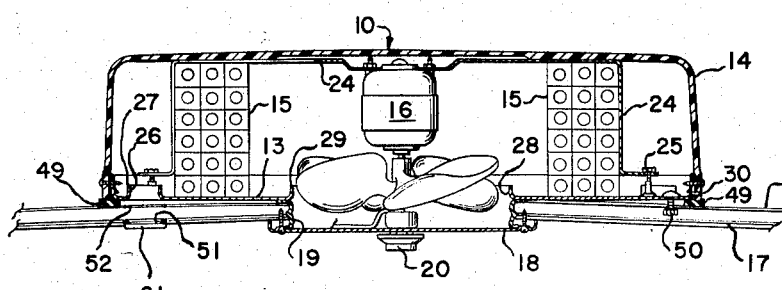
Figure 4 is a sectional view along line 4—4 of Figure 3.
Figure 8:
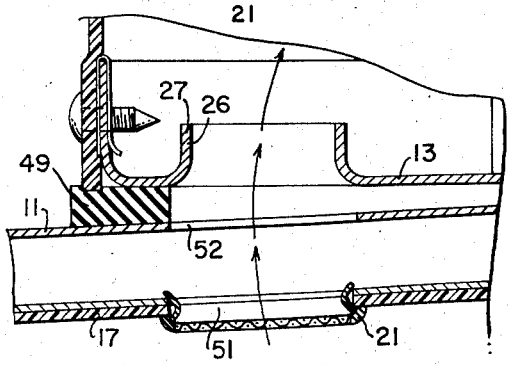
Figure 8 is an enlarged fragmentary sectional view of the lower left hand corner portion of Figure 4.

Referring to Figures 3 and 4, evaporator unit 10 is shown mounted on turret 11 through gasket 49. Headliner 17 and turret 11 have been cut away to provide for annular spacer 19. Bolts 50 serve to secure the unit to the turret 11. Evaporator coil 15 encloses and encircles fan 16 as best shown in Figure 3. X-shaped hold-down bracket 24 serves to retain the evaporator coils 15 and to support fan 16. Hold-down bracket 24 is secured by bolts 25 to base 13. The portion of the evaporator coil 15 and fan structure 16 projecting above the turret 11 is enclosed in a suitable cover 14, see Fig. 4.

Figure 6:
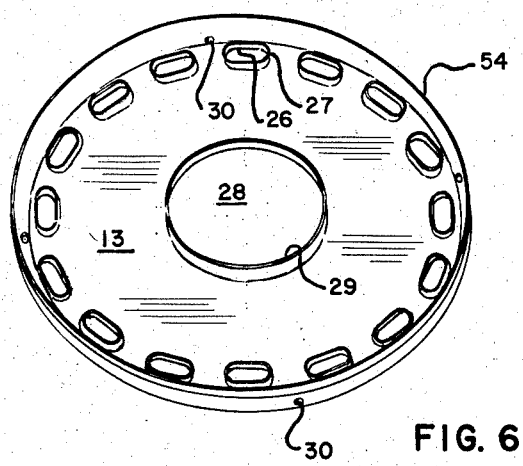
Figure 6 is a perspective view of the base.

Referring to Figure 6, base 13 is seen as made preferably in the form of a metal stamping with a central air outlet opening 28 and a plurality of smaller air inlet openings 26. Openings 28 and 26 are defined by raised lips 29 and 27, as shown. The base itself has a raised lip 54 defining its periphery. Condensate drain holes 30 provide for the escape of water that accumulates in the basin of the base from the evaporator coil. The substantially continuous evaporator coil 15 is placed on base 13 between opening 28 and inlet openings 26. It is seen that base 13 is a combination evaporator and fan support, drip pan, and air duct.

Figure 5:
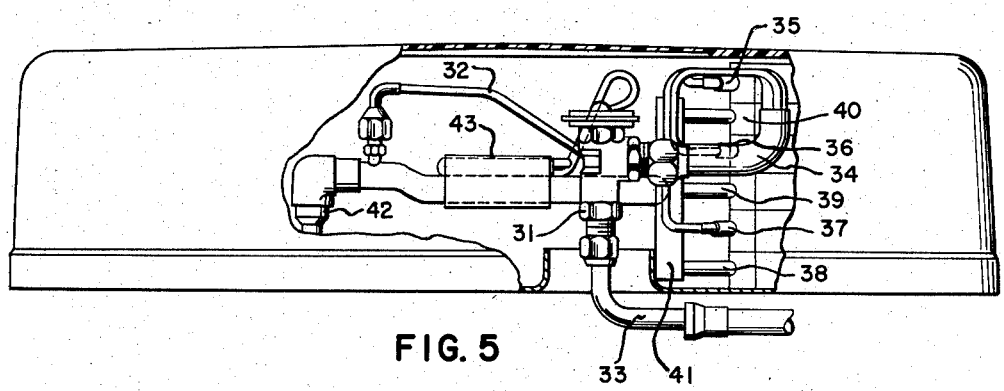
Figure 5 is a side view of the evaporator unit with the cover partly cut away to expose the connections to the evaporator coil.

Referring to Figure 5, liquid refrigerant is received through base 13 at inlet 33 of expansion valve 31. Expansion valve 31 supplies refrigerant through conduit 34 to evaporator coil inlets 35, 36 and 37 in accordance with the pressure and temperature balance across the evaporator in the well-known manner. Equalizer tube 32 connects the expansion valve 31 to the return tube 42. Expansion valve bulb 43 is fixed to the evaporator coil outlet tube 42 and senses the temperature of the gases leaving the evaporator for the operation of expansion valve 31. Evaporator outlet tube 42 is connected to the individual return pipes 38, 39 and 40 of evaporator coil 15 through header 41. The liquid refrigerant and the return gas pipes are preferably directed between the headliner 17 and the turret 11, and are brought down to the condenser and compressor through the windshield pillar posts 54 (Figure 1).

Condensate drain openings 30 are formed in base 13 at a level below lips 29 and 27, and serve the additional function of providing a certain amount of fresh air to the re-circulated air within the system.

Figure 7:
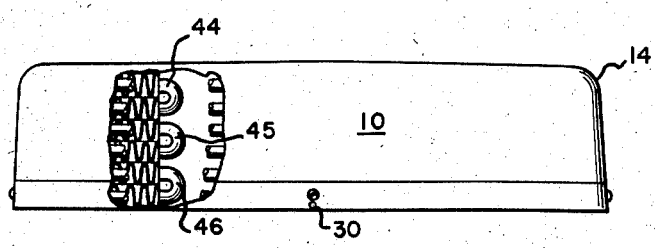
Figure 7 is a side view with the cover and evaporator coils partially cut away to expose the return bends at the end of the evaporator coil.

It will be understood that the spiral type of evaporator coils which I have shown in this embodiment is only one of several well-known types of coils which may be used with my invention. In Figure 7 is shown the return bends 44, 45 and 46. It is therefore seen that with this coil arrangement I have provided three parallel spiral evaporator coils, but any convenient number may be used in accordance with the capacity desired.

Temperature-operated microswitch 47 has its temperature sensing tube 48 in physical contact with the cooling fins of coils 15. This switch may provide circuit control for a magnetic clutch on the compressor pulley in the well-known manner. For instance, switch 47 may be set to de-magnetize the clutch and thereby disable the compressor at the point at which frost forms on the coils. Fan motor 16 is operated from the battery (not shown) of the motor vehicle and is controlled by rheostat switch 20 on grille 18 in passenger compartment for operation by the driver or a passenger.

In the operation of my invention, fan 16 draws air through coils 15 and directs this air through a tube formed by lip 29 and annular spacer 19 through grille 18 in the passenger compartment. Return air is drawn through caps 21 through openings 51 in the headliner, through openings 52 in the turret, and then through openings 26 in base 13 where it may re-enter axially through evaporator 15. Condensate which is left by the cooled air may collect in base 13 and may escape through openings 30. The size of openings 30 may be fixed to admit a certain amount of fresh air into the air circulating system, as may be desired. Rheostat 20 controls passenger area temperature by controlling the total amount of air cooled through evaporator coils 15. The minimum temperature of the coils is controlled by temperature-operated microswitch 47.

What is claimed is:

1. An air conditioner evaporator unit for mounting on the turret of a motor vehicle passenger compartment comprising a base having a periphery defined by an upwardly turned lip, said base provided with a central opening defined by an upwardly turned lip and a plurality of smaller openings radially spaced from said central opening, each of said smaller openings defined by an upwardly turned lip, an evaporator coil disposed on said base between said central opening and said smaller openings, a blower disposed within said coil and arranged to discharge through said central opening, said openings being in communication with the interior of said compartment, drain means in said base positioned below the lowest level of said lips for removing condensate from said coil, and means preventing air from being drawn into said fan other than laterally through said evaporator coil.

2. An air conditioner evaporator unit for mounting on a turret of a motor vehicle passenger compartment comprising a base provided with a central opening and a plurality of smaller openings spaced from said central opening, an evaporator coil disposed on said base between said central opening and said smaller openings, a cover secured to said base at the periphery thereof with its top portion substantially parallel to said base and adjacent the upper portion of said coil, said cover and base forming an air duct divided into concentric compartments by said coil, the air flow being through said smaller openings into the compartment thereabove, then laterally through said coils into the centermost compartment for discharge through said central opening, and a blower disposed within said centermost compartment to cause said air to flow.

3. An air conditioner evaporator unit for mounting on a turret of a motor vehicle passenger compartment, said unit comprising a base provided with a central opening and a plurality of smaller openings forming a ring about said central opening, a circular evaporator coil disposed on said base between said central opening and said smaller openings, a cover secured to said base at the periphery thereof with its top portion substantially parallel to said base and adjacent the upper portion of said coil, said cover and base forming an air duct divided into concentric compartments by said coil, the air flow being through said smaller openings into the compartment thereabove, then laterally through said coils into the centermost compartment for discharge through said central opening, and a fan and motor unit concentric with said coil disposed within said centermost compartment to cause said air flow.

4. An air conditioner evaporator unit for mounting on a turret of a motor vehicle passenger compartment, said unit having a base provided with a central opening defined by an upwardly turned lip and a plurality of smaller openings forming a ring about said central opening, each of said smaller openings being defined by an upwardly turned lip, a circular evaporator coil disposed on said base between said central opening and said smaller openings, a cover secured to said base at the periphery thereof with its top portion substantially parallel to said base and adjacent the upper portion of said coil, said cover and base forming an air duct divided into concentric compartments by said coil, the air flow being through said smaller openings into the compartment in alignment therewith, then laterally through said coils into the centermost compartment for discharge through said central opening, a fan and motor unit concentric with said coil disposed within said centermost compartment to cause said air flow, and drain means in said base positioned below the lowermost level of said lips for removing condensate from said coils.

References Cited in the file of this patent

UNITED STATES PATENTS

| | | |
|---|---|---|
| 2,239,848 | Jackson | Apr. 29, 1941 |
| 2,363,839 | Demuth | Nov. 28, 1944 |
| 2,475,841 | Jones | July 12, 1949 |
| 2,546,417 | Anglin | Mar. 27, 1951 |
| 2,638,757 | Borgerd | May 19, 1953 |
| 2,799,143 | Weigel | July 16, 1957 |